Nov. 3, 1931.    N. E. LINDENBLAD    1,830,170

AUTOMATIC FIELD CONTROL

Filed March 2, 1927

INVENTOR
NILS E. LINDENBLAD
BY
ATTORNEY

Patented Nov. 3, 1931

1,830,170

UNITED STATES PATENT OFFICE

NILS E. LINDENBLAD, OF ROCKY POINT, NEW YORK, ASSIGNOR TO RADIO CORPORATION OF AMERICA, A CORPORATION OF DELAWARE

AUTOMATIC FIELD CONTROL

Application filed March 2, 1927. Serial No. 172,139.

This invention relates to electrical timing devices, and more particularly to such a device applied to automatically control the field of a high frequency alternator.

An object of my invention is to provide a time relay wherein the time measurement is made by means of an integration of an electrical quantity.

When using a high frequency alternator for the radiation of signals it is found that even when there is no output from the alternator there are high losses, owing to the fact that the direct current field induces alternating potentials in the armature and eddy-currents and hysteresis losses result. One solution of this problem is to open the alternator field each time the transmitting key is raised, but in practice it is found that this is not feasible with transmission at high speeds. As an alternative solution, it is an object of my invention to provide means to automatically open the field after a specified time period of non-use of the alternator.

It is obvious that when the key is again closed the field must be instantly closed with it, and accordingly, it is a further object of my invention to provide a field control which will close the field upon depression of the key.

To measure the specified time period a device must be used which does not integrate the time intervals between dots and dashes, for otherwise, when these space intervals total the specified time period the field of the alternator would be opened during transmission. Experience has shown that mechanical relays are not totally non-integrating. Accordingly, a still further object of my invention is to provide an electrical time integrator which will integrate during the existence of an uninterrupted condition, for example a steadily open key, but which is so completely self restoring upon the occurrence of an interruption of that condition that there will be no possibility of integration during the interrupted condition.

Considering this object in a broader aspect, it is to provide a time relay which integrates only during the uninterrupted existence of a certain condition, but which is automatically restored to zero upon interruption of that condition.

The specification is accompanied by drawings, in which

Figure 1:
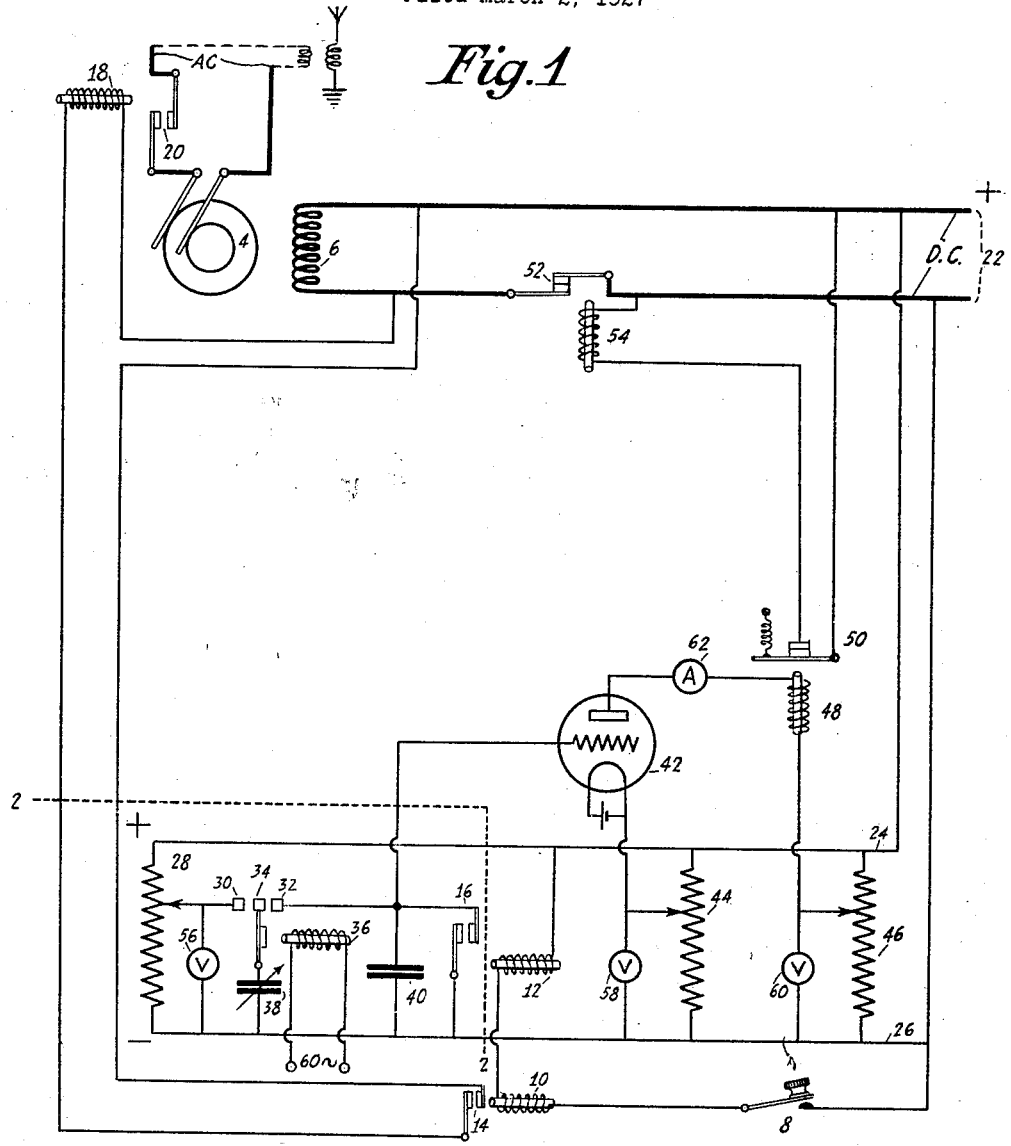
Figure 1 represents a wiring diagram for one embodiment of my invention.

Referring to Figure 1, the transmitter key 8 operates to energize the relay coils 10 and 12, which respectively close the contacts 14 and 16. When the contacts 14 are closed the relay coil 18 is energized, thereby actuating the contacts 20 to close the output circuit of the alternator 4. These relay circuits are energized from a direct current source 22, which primarily serves to magnetize the field 6 of the alternator 4.

The conductor 24, 26 are connected in parallel with the direct current supply, and represent a local bus for the time device. Across this bus there is connected a potentiometer resistance 28 by means of which the potential applied to a contact 30 may be regulated. Between the contact 30 and another fixed contact 32 there is a vibrating contact 34, the armature of which is vibrated by a coil 36 connected to an alternating current power supply. Between the contact 34 and the bus 26 there is connected a small variable charging condenser 38 which collects a small charge of electricity each time that the contacts 30 and 34 are brought together. When the contacts 32 and 34 close this charge is transferred from the charging condenser 38 to the large collecting condenser 40, which may be called, more broadly, an electro-statically chargeable body. The collecting condenser potential is applied to the grid of a vacuum tube 42, and so controls the anode-cathode current flow through the tube. The relative anode and cathode potentials, and their potential with relation to the grid potential, disregarding the effect of the condenser 40, may be adjusted by means of the potentiometers 44 and 46 which are connected across the direct current bus. The anode current of the tube flows through the coil 48, which, with the relay contacts 50, comprises a sensitive relay for operating a field control relay 52, 54.

Assume now that the key 8 is not depressed. It is then obvious that the vibrating relay contact 34 serves to transfer from the charging condenser 38 to the collecting condenser 40 a rapid succession of charges of electricity. When the charge upon the condenser 40 becomes sufficiently great so that the potential across it increases the anode current through the sensitive relay 48, the contacts 50 and consequently the contacts 52 are opened. The time necessary to charge the condenser 40 to the critical potential value, that is, the minimum potential to which the relay 48 is responsive, is directly determined by the quantity of electricity transferred from the charging condenser 38 to the collecting condenser 40 at each charge, since the frequency of vibration is constant. It is therefore possible to make this the specified time period by adjusting the condenser 38, and the potentiometer 28.

Upon depressing the key 8 the relay 12 in series with the relay 10 is actuated, closing the contacts 16, whereupon the collecting condenser 40 is short circuited and consequently instantaneously and completely discharged. During normal operation, as the key is manipulated for the transmission of signals, the condenser 40 is continually being discharged, so that the integration of electrical charges must begin anew.

For convenience several indicating instruments may be added to the circuit already described, such as the volt meters 56, 58, 60 and the milliammeter 62.

Figure 2:
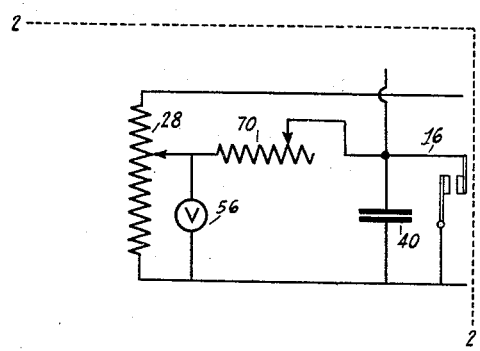
Figure 2 is a fragmentary wiring diagram of a modified portion of Figure 1.

The modification already described I deem a preferred one, as it has proven remarkably satisfactory in use. However, by way of illustration Figure 2 is submitted to show the timing circuit within the dotted line 2—2 arranged to use resistance regulation of the rate of charge. In Figure 2, as before, the condenser 40 is the collecting condenser while the contacts 16 serve to discharge the condenser upon keying. In this case, however, the rate of charge is reduced to an exceedingly slow trickle by the very high resistance 70, and is controlled by adjustment of the potentiometer 28 and the resistance 70.

I claim:

1. In an arrangement for opening the field of a generator upon the expiration of a desired time period of non-use, the combination of a high frequency generator; a relay operated field switch, responsive to a predetermined potential, for said generator; a condenser couplet to said switch; means to charge the condenser to the predetermined potential when the generator is not in use; means to adjust the rate of charge of the condenser to obtain the desired time delay; and, means to short circuit the condenser upon use of the generator.

2. An arrangement for automatically opening the field of a generator upon the expiration of a specified time period of non-use which includes the combination of a high frequency generator; a relay operated field switch, responsive to a predetermined potential, for said generator; a condenser associated with said switch; means to charge the condenser at such a rate that the condenser potential will reach the predetermined potential at the end of the specified period; and, means to discharge the condenser upon use of the generator.

3. An arrangement for automatically opening the field of a generator upon the expiration of a specified time period of non-use which comprises a relay operated field switch responsive to a minimum potential, a collecting condenser coupled thereto, a source of charging current, a charging condenser, means to alternately charge the charging condenser from the source and discharge it into the collecting condenser, and means to vary the magnitude of the charge taken by the charging condenser.

4. An arrangement for automatically opening the field of a generator upon the expiration of a specified time period of non-use comprising a relay operated field switch responsive to a minimum potential, a collecting condenser coupled thereto, a source of charging current, a charging condenser, means to alternately charge the charging condenser from the source and discharge it into the collecting condenser, means to vary the magnitude of the charge taken by the charging condenser, and means to discharge the collecting condenser when the generator is in use.

5. An arrangement for automatically opening the field current of a high frequency alternator upon the expiration of a specified time period of non-use comprising the alternator, an operating key therefor, an electron emission tube, a relay operated field current switch responsive to the magnitude of the anode current of the tube, a condenser coupled to the control electrode circuit of the tube, means to charge the condenser at such a rate that the condenser potential biases the control electrode to actuate the field current switch at the end of the specified period, in the key open position, and means to discharge the condenser in the key closed position.

6. An arrangement for automatically opening the field current of a high frequency alternator upon the expiration of a specified time period of non-use comprising the alternator, an operating key therefor, an electron emission tube, a relay operated field current switch responsive to the magnitude of the anode current of the tube, a collecting condenser coupled to the control electrode circuit of the tube, a source of charging current, a charging condenser, means to alternately charge the charging condenser from the source and discharge it into the collecting condenser, means to vary the magnitude of the charge taken by the charging condenser in order to regulate the time needed for the collecting condenser to bias the tube to actuate the field current switch, and means responsive to the closing of the operating key for discharging the collecting condenser.

7. An arrangement for automatically opening the direct current supply to a generator of high frequency oscillations upon the expiration of a specified time period without keying comprising the generator, an operating key therefor, an electron emission tube, a relay operated direct current switch responsive to the magnitude of the anode current of the tube, a condenser coupled to the control electrode circuit of the tube, means to charge the condenser intermittently at such a rate that the condenser potential biases the control electrode to actuate the switch at the end of the specified period, in the key open position, and means to discharge the condenser in the key closed position.

8. An arrangement for automatically controlling the field current of a high frequency alternator upon the expiration of a specified time period of non-use comprising the alternator, an operating key therefor, an electron emission tube, a relay operated field current controlling switch responsive to the magnitude of the anode current of the tube, a condenser coupled to the control electrode circuit of the tube, means to charge the condenser at such a rate that the condenser potential biases the control electrode to actuate the field current switch at the end of the specified period, in the key open position, and means to discharge the condenser in the key closed position.

9. An arrangement for automatically controlling the field of a generator upon the expiration of a specified time period of non-use which includes the combination of a high frequency generator; a relay operated field switch, responsive to a predetermined potential, for said generator; a condenser associated with said switch; means to charge the condenser at such a rate that the condenser potential will reach the predetermined potential at the end of the specified period; and means to discharge the condenser upon use of the generator.

10. The combination of a translating device, a high frequency generator, means for varying the magnitude of the energy transmitted between said generator and said device, and means including an electrical condenser and a space discharge valve controlled thereby arranged to change the excitation of said generator at a predetermined time after said energy has been reduced to its minimum value.

11. The combination of a translating device, a high frequency generator, means for varying the magnitude of the energy transmitted between said generator and said device, means comprising a space discharge valve arranged to control the excitation of said generator, means tending to maintain said valve in a conductive condition, and means operable to maintain said valve in a non-conductive condition for a predetermined interval of time after said energy has been reduced to its minimum value.

12. The combination of a generator comprising armature and field coils, an antenna, a device arranged to control the energy transmitted between said armature coils and said antenna, a key for controlling the operation of said device, and means operable to decrease the generator excitation when said key is not operated to cause signals to be transmitted from said antenna, said means including an electrical condenser, a space discharge valve having a control electrode to which the condenser is connected, a source of energy for charging the condenser and a resistor for controlling the charging rate of the condenser.

13. The combination of a generator comprising armature and field coils, an antenna, a device arranged to control the energy transmitted between said armature coils and said antenna, a key for controlling the operation of said device, a space discharge valve for controlling the excitation of said generator, means tending to maintain said valve in a conductive condition, and means operable to maintain said valve in a non-conductive condition while said key is being operated to transmit signals from said antenna and for a predetermined time interval thereafter.

14. The combination of a translating device, a high frequency generator, means for varying the magnitude of the energy transmitted between said generator and said device, means comprising a space discharge valve arranged to control the excitation of said generator, means tending to maintain said valve in a predetermined condition, and means operable to maintain said valve in a different condition a predetermined interval of time after said energy has been reduced to its minimum value.

NILS E. LINDENBLAD.